(12) United States Patent
Ventenat

(10) Patent No.: US 11,553,759 B2
(45) Date of Patent: Jan. 17, 2023

(54) METHOD FOR PRODUCING A SHOE AND SHOE THAT CAN BE OBTAINED BY SAID METHOD

(71) Applicant: DECATHLON, Villeneuve d'Ascq (FR)

(72) Inventor: Vincent Ventenat, Villeneuve d'Ascq (FR)

( * ) Notice: Subject to any disclaimer, the term of this patent is extended or adjusted under 35 U.S.C. 154(b) by 104 days.

(21) Appl. No.: 16/972,093

(22) PCT Filed: Jun. 7, 2019

(86) PCT No.: PCT/FR2019/051390
§ 371 (c)(1),
(2) Date: Dec. 4, 2020

(87) PCT Pub. No.: WO2019/234374
PCT Pub. Date: Dec. 12, 2019

(65) Prior Publication Data
US 2021/0219659 A1    Jul. 22, 2021

(30) Foreign Application Priority Data

Jun. 8, 2018   (FR) ...................................... 1855042

(51) Int. Cl.
*A43B 23/02*     (2006.01)
*A43B 23/04*     (2006.01)
(Continued)

(52) U.S. Cl.
CPC .............. *A43B 23/024* (2013.01); *A43B 1/04* (2013.01); *A43B 5/02* (2013.01); *A43B 13/223* (2013.01);
(Continued)

(58) Field of Classification Search
CPC ....... A43B 23/024; A43B 23/042; A43B 5/02; A43B 1/04; B29D 35/06; B29D 35/08;
(Continued)

(56) References Cited

U.S. PATENT DOCUMENTS 2,538,673 A    1/1951    Donahue
2,740,143 A    4/1956    Frieri
(Continued)

FOREIGN PATENT DOCUMENTS

CN    103653542 A    3/2014
CN    103919331 A    7/2014
(Continued)

OTHER PUBLICATIONS

English language abstract of CN103653542.
(Continued)

*Primary Examiner* — Robert B Davis
(74) *Attorney, Agent, or Firm* — Robert Facey

(57) ABSTRACT

The subject matter of the present disclosure is a process for manufacturing a shoe comprising an outsole joined to the sole part of a first main liner comprising on its outer face at least two studs, and a first auxiliary liner, at least partially, in particular integrally, hot-melt, in a textile piece, covering at least part of the first main liner, the outsole, and the junction between the first main liner and the outsole, at least part or all of the first hot-melt auxiliary liner being melted and adhered to the first main liner and to the outsole.

27 Claims, 8 Drawing Sheets

(51) Int. Cl.
  *B29D 35/12* (2010.01)
  *B29D 35/14* (2010.01)
  *A43B 1/04* (2022.01)
  *A43B 5/02* (2006.01)
  *A43B 13/22* (2006.01)
  *B29D 35/06* (2010.01)

(52) U.S. Cl.
  CPC ............ *A43B 23/042* (2013.01); *B29D 35/06* (2013.01); *B29D 35/126* (2013.01); *B29D 35/128* (2013.01); *B29D 35/146* (2013.01)

(58) Field of Classification Search
  CPC .. B29D 35/085; B29D 35/126; B29D 35/128; B29D 35/146
  See application file for complete search history.

(56) References Cited

U.S. PATENT DOCUMENTS

| | | |
|---|---|---|
| 3,583,081 A | 6/1971 | Hayashi |
| 3,863,272 A | 2/1975 | Guille |
| 4,134,955 A | 1/1979 | Hanrahan, Jr. et al. |
| 4,317,292 A | 3/1982 | Melton |
| 5,345,638 A | 9/1994 | Nishida |
| 5,617,585 A | 4/1997 | Fons |
| 6,308,438 B1 | 10/2001 | Throneburg |
| 7,051,460 B2 | 5/2006 | Orei et al. |
| 7,347,011 B2 | 3/2008 | Dua et al. |
| 7,836,608 B2 | 11/2010 | Greene |
| 8,225,530 B2 | 7/2012 | Sokolowski et al. |
| 8,321,984 B2 | 12/2012 | Dojan et al. |
| 8,650,916 B2 | 2/2014 | Dua et al. |
| 8,745,896 B2 | 6/2014 | Dua et al. |
| 8,800,172 B2 | 8/2014 | Dua et al. |
| 8,959,959 B1 | 2/2015 | Podhajny |
| 9,032,574 B2 | 5/2015 | Hernandez Hernandez |
| 9,301,567 B2 | 4/2016 | Dealey et al. |
| 9,439,475 B2 | 9/2016 | Ikenaka |
| 9,604,440 B2 | 3/2017 | Hernandez |
| 9,668,544 B2 | 6/2017 | Bruce et al. |
| 9,713,361 B2 | 7/2017 | Fisher et al. |
| 9,775,401 B2 | 10/2017 | Cross et al. |
| 10,112,357 B2 | 10/2018 | Boucher et al. |
| 10,351,978 B2 | 7/2019 | Spielmann |
| 10,624,395 B2 | 4/2020 | Craig |
| 10,631,594 B2 | 4/2020 | Boucher et al. |
| 2003/0089000 A1 | 5/2003 | Tseng |
| 2003/0126762 A1 | 7/2003 | Tseng |
| 2007/0204482 A1 | 9/2007 | Gibson-Collinson |
| 2007/0227038 A1* | 10/2007 | Edington ............ A43B 23/042 36/10 |
| 2008/0216357 A1 | 9/2008 | Fogg |
| 2011/0225845 A1 | 9/2011 | Dean et al. |
| 2012/0233882 A1 | 9/2012 | Huffa et al. |
| 2013/0047467 A1 | 2/2013 | Roether et al. |
| 2013/0255103 A1 | 10/2013 | Dua et al. |
| 2013/0269209 A1 | 10/2013 | Lang et al. |
| 2014/0130376 A1* | 5/2014 | Fahmi ................... A43B 23/07 36/84 |
| 2014/0310984 A1 | 10/2014 | Tamm et al. |
| 2015/0013187 A1 | 1/2015 | Taniguchi et al. |
| 2015/0104592 A1 | 4/2015 | Itoi |
| 2015/0107307 A1 | 4/2015 | Kosui et al. |
| 2015/0230541 A1 | 8/2015 | Bacino et al. |
| 2015/0230550 A1 | 8/2015 | Bacino et al. |
| 2015/0230554 A1 | 8/2015 | Bacino et al. |
| 2015/0230563 A1 | 8/2015 | Bacino et al. |
| 2015/0289592 A1 | 10/2015 | Song |
| 2015/0313316 A1 | 11/2015 | Boucher et al. |
| 2015/0374062 A1 | 12/2015 | Ikenaka et al. |
| 2016/0000173 A1 | 1/2016 | Spielmann |
| 2016/0058099 A1 | 3/2016 | Panian et al. |
| 2016/0106182 A1 | 4/2016 | Yun |
| 2016/0185062 A1 | 6/2016 | Boucher et al. |
| 2016/0198798 A1 | 7/2016 | Ikenaka et al. |
| 2016/0206039 A1 | 7/2016 | Cross et al. |
| 2016/0206040 A1 | 7/2016 | Cross et al. |
| 2016/0206042 A1 | 7/2016 | Cross et al. |
| 2016/0206046 A1 | 7/2016 | Cross |
| 2016/0262494 A1 | 9/2016 | Weidl |
| 2016/0326673 A1 | 11/2016 | Reguillon et al. |
| 2017/0152615 A1 | 6/2017 | Jang et al. |
| 2017/0181501 A1 | 6/2017 | Gautier et al. |
| 2017/0311672 A1 | 11/2017 | Hipp et al. |
| 2017/0325546 A1 | 11/2017 | Becker et al. |
| 2017/0340064 A1 | 11/2017 | Boucher et al. |
| 2017/0342612 A1 | 11/2017 | Kawakami et al. |
| 2018/0255864 A1 | 9/2018 | Kuo et al. |
| 2018/0317592 A1* | 11/2018 | Rudolf ................... A43B 7/12 |
| 2018/0326633 A1 | 11/2018 | Hernandez Hernandez |
| 2019/0191820 A1 | 6/2019 | Hoying et al. |
| 2019/0208862 A1 | 7/2019 | Poegl et al. |
| 2019/0216174 A1 | 7/2019 | O'Haire et al. |
| 2020/0031072 A1 | 1/2020 | Leslie et al. |
| 2020/0297069 A1* | 9/2020 | Bell ........................ D04B 1/16 |
| 2021/0161242 A1* | 6/2021 | Bruce ..................... A43B 1/04 |

FOREIGN PATENT DOCUMENTS

| | | |
|---|---|---|
| CN | 203986311 U | 12/2014 |
| CN | 205529503 U | 8/2016 |
| CN | 106108237 A | 11/2016 |
| CN | 106666911 A | 5/2017 |
| CN | 106702648 A | 5/2017 |
| CN | 106923437 A * | 7/2017 ............... A43B 1/04 |
| CN | 107348601 A | 11/2017 |
| CN | 207041027 U | 2/2018 |
| DE | 102015106379 A1 | 10/2015 |
| EP | 1511615 B1 | 2/2006 |
| EP | 2649898 A1 | 10/2013 |
| EP | 2792265 A2 | 10/2014 |
| EP | 2815668 A1 | 12/2014 |
| EP | 2742820 B1 | 3/2015 |
| EP | 3009023 A1 | 4/2016 |
| EP | 2922435 B1 | 11/2016 |
| EP | 2805638 B1 | 3/2017 |
| EP | 3153052 A1 | 4/2017 |
| EP | 3162239 A1 | 5/2017 |
| EP | 3563713 A1 | 5/2017 |
| EP | 2964043 B1 | 12/2018 |
| EP | 3075277 B1 | 4/2019 |
| EP | 2800493 B1 | 6/2019 |
| EP | 2750533 B1 | 9/2019 |
| EP | 2964044 B1 | 12/2019 |
| EP | 2922434 B1 | 1/2020 |
| EP | 2996507 B1 | 3/2020 |
| EP | 3102721 B1 | 4/2020 |
| EP | 3071063 B1 | 11/2020 |
| FR | 3002551 A1 | 8/2014 |
| FR | 3007317 A1 | 12/2014 |
| FR | 3014120 A1 | 6/2015 |
| GB | 2408190 A | 5/2005 |
| KR | 101500624 B1 | 3/2015 |
| KR | 20160019725 A | 2/2016 |
| WO | 2014/085206 A1 | 6/2014 |
| WO | 2014/096561 A1 | 6/2014 |
| WO | 2014/130598 A2 | 8/2014 |
| WO | 2014/134244 A1 | 9/2014 |
| WO | 2015/011148 A1 | 1/2015 |
| WO | 2015/011156 A1 | 1/2015 |
| WO | 2015/126613 A1 | 8/2015 |
| WO | 2016/007878 A1 | 1/2016 |
| WO | 2016/032854 A1 | 3/2016 |
| WO | 2016/107990 A1 | 7/2016 |
| WO | 2016/115157 A1 | 7/2016 |
| WO | 2016/156676 A1 | 10/2016 |
| WO | 2016/208982 A1 | 12/2016 |
| WO | 2017/044313 A1 | 3/2017 |
| WO | 2017044318 A1 | 3/2017 |
| WO | 2017/127441 A1 | 7/2017 |
| WO | 2017/142857 A1 | 8/2017 |
| WO | 2018/009414 A1 | 1/2018 |

(56) References Cited

FOREIGN PATENT DOCUMENTS

| | | |
|---|---|---|
| WO | 2018/089704 A1 | 5/2018 |
| WO | 2019/081767 A1 | 5/2019 |
| WO | 2019/234274 A1 | 12/2019 |

OTHER PUBLICATIONS

English language abstract of WO2016/156676 A1.
English language abstract of CN106666911 A.
English language abstract of CN106702648 A.
English language abstract of CN205529503 U.
English language abstract of KR20160019725 A.
English language abstract of WO2016/208982 A1.
English language abstract of CN106108237 A.
English language abstract of DE102015106379 A1.
English language abstract of CN103919331 A.
English language abstract of CN107348601 A.
English language abstract of CN203986311 U.
English language abstract of 207041027 U.
English language abstract of WO2015/011148 A1.
English language abstract of WO 2015/011156 A1.
English language abstract of KR 101500624 B1.
English language abstract of WO2019081767 A1.

* cited by examiner

METHOD FOR PRODUCING A SHOE AND SHOE THAT CAN BE OBTAINED BY SAID METHOD

The present disclosure relates to the technical field of processes for manufacturing a shoe component or a shoe.

The present disclosure also has its subject matter the shoes obtained by implementing said manufacturing processes.

BACKGROUND

The subject matter of EP 2 815 668 A1 is a process for manufacturing a shoe comprising a first step of manufacturing the molded upper, during the course of which a rigid foot-shaped core is covered by an upper element then placed in a mold. A resin is then injected into said mold according to a mask covering all or part of the upper. The upper thus prepared is then placed in a mold for the manufacture of the outer sole by injecting a resin directly onto the lower face of the upper. This process allows the upper and sole of a shoe to be manufactured and assembled in a simplified, seamless manner.

The subject matter of WO 2014/130598 A2 is a process for manufacturing a shoe upper comprising arranging an upper on a perforated rigid core disposed on a plate. A waterproof deformable membrane is disposed on the upper placed on the core, then the membrane is pressed against the upper and thus the core by the effect of air suction through the perforations of the core. During this step, the core is heated so that the upper eventually adheres to another at least partially thermofusible element. This process allows an upper to be manufactured without seams, but it is not suitable for simultaneously attaching a sole to the upper.

The subject matter of FR 3 007 317 A1 is a process for manufacturing a shoe upper comprising arranging an upper on a rigid core, then a waterproof membrane on the upper, the assembly being placed in an enclosure in which a vacuum is applied so as to press the membrane on the core and thus the upper.

Previous processes seek to decrease the number of steps necessary in the construction of a shoe, in particular by eliminating the sewing steps consisting in attaching the upper to a sole. Indeed, the soles are conventionally in the state of the art attached to the uppers by means of a so-called Strobel assembly during which the various sole parts (insole, midsole and outsole) are glued. However, in the previous processes during which the sole is attached to the upper during the manufacture of the upper and/or the sole, the sole-upper assembly has poor resistance to delamination, the sole having a tendency to separate from the upper. This disadvantage is amplified when the sole is subjected to forces tending to move it away from the upper. This phenomenon is in particular observed when the sole has projections on its underside that come into contact with the ground, for example for soccer or hiking boots.

The present disclosure proposes a shoe whose manufacturing process allows a very significant saving of time and labor.

The present disclosure proposes a shoe having an aesthetic appearance different from shoes obtained by Strobel assembly, lighter, consuming less material for its manufacture, thus reducing its environmental impact, in particular by avoiding the use of upper pattern, and having an outsole that is resistant to abrasion and ensures cushioning performance.

The present disclosure proposes a shoe that is easier to put on, having an improved feel, comfort, and improved resistance to delamination of the outsole.

SUMMARY

The subject matter of the present disclosure, according to a first aspect, is a process for manufacturing a shoe characterized in that it comprises the following steps:

(i) providing at least one main liner in a textile piece, having a sole part;
(ii) placing at least the first main liner on a preform;
(iii) joining an outsole to the sole part of the first main liner;
(iv) providing at least one first auxiliary liner in a textile piece, at least part or all of which is thermofusible and has a melting temperature T1 (° C.);
(v) arranging the first auxiliary liner on, the first main liner and the outsole, so as to cover, at least in part, the first main liner, the outsole, and the junction between the first main liner and the outsole;
(vi) subjecting the assembly comprising the first auxiliary liner, the first main liner, and the outsole, arranged on the preform, to a heating temperature Tc greater than or equal to the temperature T1 so as to achieve fusion of the thermofusible part or the entire first auxiliary liner;
(vii) removing the assembly from the entire preform and recovering the shoe.

Advantageously, the first auxiliary liner, is melted, at least partially or completely, and thus improves the resistance to delamination between the outsole and the first main liner since it covers their junction.

Moreover, the first auxiliary liner being in a textile piece, it is possible to select the arrangement of the thermofusible yarns, its shape in relation to the areas of the first main liner to be covered, in particular according to the technical effects of reinforcement/flexibility and aesthetics sought.

The use of a textile piece in the form of a liner, at least partially or completely thermofusible, facilitates its correct placement on the first main liner, which is placed on a preform.

Preferably, the first main liner and/or the first auxiliary liner and/or the second main liner (described below) and/or the second auxiliary liner (described below) and/or the additional sock, is/are each, an shell comprising a sole part (intended to come under the wearer's foot), a lateral part (intended to come into contact with the lateral side of the wearer's foot), a medial part (intended to come into contact with the medial side of the wearer's foot), a front part as an extension of the medial, lateral and sole parts (intended to cover the front of the foot), and a rear part as an extension of the medial, lateral and sole parts (intended to cover the rear of the foot).

The shell preferably delimits an inner volume intended to receive the wearer's foot.

In an embodiment, said shell is in a unitary textile piece.

It is understood by unitary textile piece that the sole parts, lateral, medial, front and back are in the same textile piece obtained from a textile loom. The shaping of an shell of the textile piece can be obtained on the textile loom, for example by knitting on the knitting machine, or by sewing. In the latter case, the free edges of the piece are assembled but no yoke is added to finish the piece other than to reinforce the joining edges.

The textile piece may comprise a first background pattern (for example related to the mesh pattern or weave pattern) and at least one second pattern (also related to the mesh pattern or weave pattern) different from the first pattern (distinguishable visually and/or by touch and/or by softness and/or thickness).

The textile piece comprises at the opening of the (first/second) (main/auxiliary) liner, or at the opening of the additional sock (defined below), for inserting the foot, an area in the form of a closed or open collar, in a mesh pattern of the type rib n×p, n and p being integers different from 0 and less than or equal to 5, for example ribs 1×1, or 1×2. This area thus forms a flexible border facilitating the insertion of the foot.

In an embodiment, the first main liner and/or the first auxiliary liner and/or the second main liner (described below) and/or the second auxiliary shoe (described below), is/are each, in a knitted or woven unitary textile piece.

Preferably, the first main liner and/or the first auxiliary liner and/or the second main liner (described below) and/or the second auxiliary liner (described below) and/or the additional sock, is/are each, in a textile piece obtained by the mechanical handling of a set of yarns, in particular on a knitting or weaving machine. The knitting machine can be a circular knitting machine, preferably of small diameter, or a flat knitting machine, preferably with a reduced needle bed length. The textile piece can be a piece knitted with picked stitches or thrown stitches, in particular run-free, but is preferably in a piece knitted with picked stitches (the stitches are formed in the weft direction, not in the direction of the wales as is the case with a piece knitted with thrown stitches).

The textile piece(s) in which one or more liners according to the disclosure is/are formed may each comprise, indifferently in one or more parts selected from the sole part, the medial part, the lateral part, the forefoot part, and the rear part, a textile layer or at least two superimposed textile layers, in particular substantially co-extensive.

Where the textile piece is of unitary textile construction, the textile layer(s) is/are of unitary textile construction with the textile piece comprising them.

Preferably still, said textile piece comprises yarns selected from multifilament yarns, monofilament yarns, and yarns spun from fibers, more particularly the yarns can be of the same color or be in different colors.

The monofilament yarns preferably have a diameter greater than 0.01 mm and less than or equal to 5 mm, more preferably greater than or equal to 0.1 mm and less than or equal to 2 mm.

The multifilament yarns and/or spun yarns preferably have a titer greater than or equal to 10 dtex and less than or equal to 1 000 dtex, more preferably greater than or equal to 30 dtex and less than or equal to 500 dtex.

The multifilament yarns can be FDY (Full Drawn Yarn), DTY (Draw Textured Yarn) or POY (Partially Oriented Yarn) textured yarns, or a mixture thereof.

The yarns may be at least partially or completely thermofusible, or not thermofusible.

The thermofusible yarns may be yarns comprising at least two components, in particular of the two-component type, a first component having a melting temperature less than or equal to the heating temperature Tc, and a second component having a given melting or degradation temperature higher than the heating temperature Tc.

The thermofusible yarns can be single component yarns the melting temperature of which is less than or equal to the heating temperature Tc.

The first and/or second auxiliary liner(s) may comprise (or consist of) one or more one-component and/or two-component thermofusible yarns, optionally with non-thermofusible yarns (defined below).

Preferably, the first and/or second auxiliary liner(s) consist(s) (at least) of several one-component thermofusible yarns, in particular whose titer is comprised between 300 dtex and 900 dtex (bounds included), more particularly comprised between 400 dtex and 800 dtex (bounds included), in particular of the order of 600 dtex.

The first and/or second main liner(s) and/or the additional liner may comprise (or consist of) one or more non-thermofusible yarns, optionally mixed with one or more one-component and/or two-component thermofusible yarns.

The first component can be selected from polyurethanes, in particular thermoplastic polyurethanes, polyamides, such as polyamide 6 or 66, polyolefins, such as polypropylene (PP) or polyethylene (PE), preferably from polyurethanes.

The first component can be colored or colorless and/or opaque or transparent.

The second component can be selected from polyolefins, such as high-density polyethylene, polyamides, such as polyamide 4-6, polyesters, such as polyethylene terephthalate.

The two-component yarns can be of the core-coat type, with the core being formed of the second component and the coat being formed of the first component.

The multifilament yarns and/or monofilament yarns and/or spun yarns, in particular those which are not thermofusible or whose overall melting or degradation temperature is above the heating temperature Tc, are selected from a first list of synthetic compounds: polyesters, in particular polyethylene terephthalate; polyamides, such as PA 6, PA 66, PA 4-6, PA 12; polyolefins, such as polypropylene, polyethylene, PEEK, UHMWPE (ultra-high-molecular-weight polyethylene); aramids, in particular meta-aramid or para-aramid or a mixture thereof; vinyl acetates; polyacrylics, such as polyacrylonitrile; elastomers; elastanes, or a mixture thereof; and/or a second list of compounds, in particular natural compounds or compounds derived from regenerated natural materials: cotton, viscose, flax, sisal, wool, jute, silk, hemp, and/or a third list of inorganic compounds: carbon, mineral fibers, such as rock fiber, glass.

In an embodiment, the first main liner and/or the second main liner each comprise(s), a C- or O-shaped area (of unitary textile construction with the textile shell) surrounding all or part of the foot insertion opening and/or an instep area extending from the foot insertion opening toward the front of the foot comprising at least one elastic yarn, in particular made of elastane.

This arrangement gives flexibility to the upper and facilitates the insertion of the foot and then its maintenance.

In the present text, elastic yarn is understood to mean any yarn whose elongation at break is greater than or equal to 200%, in particular greater than or equal to 300%, in particular greater than or equal to 400%. The elastic yarn preferably comprises an elastic core, in particular made of elastane, and optionally one or more cover yarns, in particular in the first list mentioned above. Elongation can be measured using the standard ASTM D 1578-93 (2016).

In an embodiment, the first main liner and/or the second main liner comprise multifilament yarns the titer of which is comprised between 300 dtex and 600 dtex, in particular made of polyethylene terephthalate, in particular 468 dtex for 204 filaments.

In an embodiment, the first main liner and/or the second main liner each comprise(s), a first set of knitted loop stitches each of which is formed by at least two yarns, in particular two or three yarns, and a second set of knitted loop knit stitches each of which is formed by a single yarn, preferably the yarns of the first and second sets have similar titers (dtex). The first set of stitches and/or the second set of stitches can be placed in any of the following parts of the textile shell: the medial part, the lateral part, the back part, the front part and optionally the sole part.

This arrangement is obtained advantageously by placing at least several yarns in the same needle when knitting the textile piece forming the liner. Advantageously, the first set of stitches forms a first region whose thickness (mm) is greater than the thickness of the second region formed by the second set of stitches.

Preferably, the outsole comprises opposite inner and outer faces, the inner face being oriented towards the sole part of the first main liner, and the outer face being oriented towards the outside of the shoe so as to come into direct contact, at least in part, with the ground.

Advantageously, the sole part of the insole of the first main liner comprises opposite inner and outer faces, the inner face opening into the inner volume of the first main liner intended to receive the foot, and the outer face is placed against the inner face of the outsole.

In a sub-variant, the sole part of the first main liner comprises at least 30% by mass, in particular at least 40% by mass, more particularly at least 50% by mass, in relation to the total mass of the sole part of the first main liner, of thermofusible yarns, in particular whose highest melting temperature is less than or equal to the heating temperature Tc.

Preferably, the sole part of the first main liner is made entirely of thermofusible yarns, in particular those with the highest melting temperature less than or equal to the heating temperature Tc, so that after step vi), the first main liner no longer comprises a sole part.

The melted material of the sole part of the first main liner adheres to the outsole, and reinforces the attachment of the first main liner, in particular around the perimeter of the medial, lateral, front and rear parts to the inner face of the outsole.

The outsole may be glued and/or sewn to the sole part of the first main liner or, preferably, extruded and (over) molded, or injected ((over)molded), or obtained by additive manufacturing, on the sole part of the first main liner.

When the outsole is glued and/or sewn, it is preferably a three-dimensional molded or textile piece, for example consisting of textile inner and outer layers joined together by binding yarns.

The outsole preferably comprises a set of projections projecting from its outer face (and therefore intended to come into contact with the ground), for example studs.

The outsole may comprise at least one projection, optionally a set of projections, projecting from its inner face (and thus into the inner volume receiving the foot), for example at the heel and/or forefoot region. The projection(s) has/have a cushioning function and/or a function as a connecting member(s) configured to cooperate with one or more complementary connecting member(s) comprised in the shoe.

The outsole may be made of one or more materials selected from: polyurethanes, in particular thermoplastics, thermoplastic elastomers, silicones, natural or synthetic rubbers, such as ethylene vinyl acetate (EVA), for example styrene butadiene rubber, EPDM (ethylene-propylene-diene monomer) rubbers, polyamides, or mixtures thereof. Of course, when the outsole is injected or extruded, the material(s) of which it is made is/are selected so as to be suitable for the application of this technique, in particular is/are thermoplastic.

Preferably, the projection(s) projecting from the inner and/or outer face of the outsole, is/are also made of the material(s) selected among those mentioned above that is/are part of the composition of the outsole.

In the present text, additive manufacturing is understood to mean any three-dimensional manufacturing technique for a part, in particular an outsole, consisting of depositing a composition comprising at least one material (in particular selected from those mentioned above, in particular in the molten state) on a support (in particular the sole part of the first main liner) in successive layers. Additive manufacturing preferably comprises 3D printing and/or any sintering technique that can be used to manufacture an outsole and/or any so-called vacuum casting technique.

The material(s) that can be used in the manufacture of the outsole is/are selected from the above-mentioned list but also from polyesters, such as polyactic acid and its derivatives, ABS (acrylonitrile butadiene styrene), thermoplastic polyurethanes, polyamides, and photo-curable resins.

In the present text, the junction is understood to mean the area where the outsole and the first main liner are joined.

The preform preferably has the shape of a foot.

In a first embodiment, the heating in step (vi) uses a heating system, in particular by infrared or induction or with the help of electric heating resistor(s), placed inside and/or outside the preform.

During step (vi), the assembly arranged on the preform can also be, alternatively or complementarily, subjected to an applied heating source, in particular greater than or equal to Tc, outside the assembly placed on the preform. Said heating source may be placed in an enclosure, at least partially closed, heated, in particular to a temperature greater than or equal to Tc, or placed in a counter-mold configured so as to be complementary to the preform, and in particular to receive the assembly of step (vi).

In a second embodiment, optionally in combination with the first embodiment, during step (vi), the assembly arranged on the preform is placed, at least partly in a counter-mold. The counter-mold, cooperating with the preform, can be in two or three parts.

The counter-mold may comprise one or more heating source(s) (infrared or other), in particular with a heating temperature greater than or equal to Tc.

The inner face of the counter-mold in contact with the assembly may comprise one or more smooth region(s) and/or comprise one or more engraved region(s) for allowing the creation of raised patterns following the total or partial fusion of the first auxiliary liner and/or the second auxiliary liner.

Advantageously, a smooth region of the counter-mold forms a glossy region on the surface of the thermoformed assembly and therefore of the upper, as opposed to an engraved region allowing a raised and/or matt surface to be obtained.

The preform can be a rigid part or a flexible shell, in particular waterproof, configured to be inflated.

When the preform is in a flexible shell, the process according to the disclosure comprises inflation means for inflating the flexible shell and pressing it against the inner walls of the first main liner. Preferably, the assembly is then sandwiched between the inflatable shell and the counter-mold.

It is possible to place a rigid or semi-rigid element inside the inflatable preform in order to keep it in position and in the shape of the foot during inflation.

The determination of the inflation pressure and the heating temperature(s) is part of the general knowledge of the person skilled in the art and is determined by routine testing.

In a sub-variant, the counter-mold cooperating with the preform comprises a base surface defining a base volume corresponding to a determined foot shape and one or more regions projecting from the base surface into said volume and/or recessed from the base surface, in particular outside said volume.

Advantageously, the assembly is thermoformed according to a base volume corresponding to the determined shape of a foot for a given size. The recessed regions of the base volume allow the shaped assembly to have a greater thickness than the regions projecting into the base volume.

In an embodiment, the preform when it is in a flexible shell may comprise projections whose free ends are pointed so that during step (vi) the latter penetrate at least partially into the thickness of the assembly, in particular into the inner face of the assembly, in particular formed by the inner face of the first main liner, towards optionally the outer face of the assembly, in particular formed by the outer face of the first or second auxiliary liner. Advantageously, these projections come to rest against the inner face of the assembly subjected to heat thus generating microperforations producing an assembly which allows air to pass and is therefore breathable. The size of the ends of the projections can be determined so that the assembly is permeable to air but impermeable to water.

The use of a rigid preform allows the heating means to be placed inside the preform, whereas the use of a flexible and therefore inflatable preform requires that the heating means be supported by the complementary counter-mold.

The technique for shaping the upper resulting from the implementation of the assembly according to the process of the disclosure is a function of the precision of the desired heating, the composition of the assembly and thus the desired (aesthetic) result.

The assembly obtained in step (vii) preferably forms the upper of the shoe.

One or more additional element(s), such as a reinforcement, for example a buttress or a hard end, can be added to the assembly.

In a variant of an embodiment, the first auxiliary liner is in a unitary textile piece, in particular knitted.

This arrangement improves the productivity of the process since it is not necessary to join different components together to manufacture an upper.

Furthermore, the aesthetic result obtained is different.

In a variant of an embodiment, the thermofusible part of the first auxiliary liner represents at least 50%, more preferably at least 80%, by mass of the total mass of the first auxiliary liner, preferentially at least 90%, in particular at least 95%, more particularly at least 99% or roughly 100% by mass of the total mass of the first auxiliary liner (in this case the entire liner is thermofusible).

Preferably, the first auxiliary liner is completely fused to the first main liner.

When the first auxiliary liner is not totally thermofusible, the thermofusible part may correspond to one or more area(s) distributed on the first auxiliary liner, in particular distributed in one or more parts selected among the sole, front, rear, lateral and medial parts.

The thermofusible part or the totality of the fused first auxiliary liner flows into the thickness of the first main liner and forms a film on all or part of the latter.

In a variant of an embodiment, the outsole comprises according to its outer face at least one projection projecting from the latter, and the sole part of the first auxiliary liner comprises at least one area adapted to receive, at least partially, said projection.

Said projection can be a stud or all or part of the heel. Said at least one projection projecting from the outer face of the outsole naturally comes into direct contact with the ground.

In an embodiment, said adapted area is a pocket of unitary textile construction with the first auxiliary liner or, preferably, a through-opening (i.e. extending from its inner face to its outer face), in particular of unitary textile construction with the first auxiliary liner.

In an embodiment, the sole part of the first auxiliary liner comprises a set of openings, in particular greater than or equal to 2, in particular comprised between 5 and 12.

In an embodiment, the outsole comprises on its outer face a set of projections, in particular studs for soccer or hiking for example, projecting from the latter.

The projections, in particular studs, are housed in the pockets or project through said through-openings.

Naturally, the projection(s), in particular said stud(s), projecting from the outer face of the outsole is/are intended in operation to come into direct contact with the ground.

In an embodiment, said adapted area is a pocket, and the outsole with its projections is brought back against the inner face of the sole part of the first main liner. In this case, the outsole is not over-molded on the sole part of the first main liner.

In a variant, said at least one projection comprises a lower face configured to come into contact with the ground.

In a variant of an embodiment, the process comprises a step of providing a second main liner having a sole part comprising at least one area adapted to receive, at least in part, said projection, the second main liner being arranged:

on the first auxiliary liner in step (v) such that the first auxiliary liner is disposed, at least in part, between the second main liner and the first main liner; or on the first main liner in step (v) such that the second main liner is disposed, at least in part, between the first main liner and the first auxiliary liner.

Advantageously, a second main liner is placed on top of the first main liner, which improves tear resistance and reinforces the upper. It is also possible to differentiate the first main liner from the second main liner (in particular according to the yarns, the mesh pattern, the thickness, and this according to the different parts of the foot which can have different dimensions) and thus to increase the possible upper variants.

Said at least one projection projects from the outer face of the outsole.

In an embodiment, the back part of the second main liner has a height greater than the height of the back part of the first main liner.

This second main liner is attached in whole or in part to the first main liner, and optionally to the outsole. When the second main liner covers said junction area between the outsole and the first main liner, the resistance to delamination is further improved.

The second main liner is attached to the first main liner through the first auxiliary liner when it is at least partially fused.

In an embodiment, the first main liner comprises a first region, and the second main liner comprises a second region, the first region having a thickness (e1) different from the thickness (e2) of the second region, in particular e1 is less than e2.

In an embodiment, the rearfoot part, the lateral part and the medial part, of the first main liner and/or the second main liner, each comprise a first region having a thickness e3 (mm) greater than the thickness e4 (mm) of a second region adjacent to the first region, in particular the first regions improve foot support.

In an embodiment, the sole part of the first main liner has a thickness e5 (mm) (in at least one region) less than the thickness (in at least one region) of at least one of the lateral, medial, forefoot or rearfoot portions of said first auxiliary liner.

Advantageously, this arrangement improves the adhesion of the sole part of the second main liner with the outsole when the first auxiliary liner is at least partially fused.

In an embodiment, the sole part of the first main liner has a thickness (in at least one region) greater than the thickness (in at least one region) of the sole part of the second main liner.

Advantageously, this arrangement promotes the setting of the outsole when it is over-molded on the sole part as well as the resistance to delamination.

In an embodiment, the forefoot part, the lateral part and the medial part, of the first main liner and/or the second main liner, each comprise a third region having a thickness e7 (mm) greater than the thickness e8 (mm) of a fourth region adjacent to the third region, in particular the third regions improve wear resistance and protect the foot during contact with the ball for example.

In an embodiment, said adapted area of the second main liner is a pocket of unitary textile construction with the second main liner or, preferably, a through-opening, in particular of unitary textile construction with the second main liner.

The projections, in particular studs, are housed in the pockets or project through the openings of the second main liner, and in particular through the openings of the first auxiliary liner.

In a variant of an embodiment, the process comprises:
  providing a second auxiliary liner in a textile piece, at least part or all of which is thermofusible and has a melting temperature T2 (° C.); and
  arranging in step (v) the second auxiliary liner over the second main liner and the outsole so as to cover, at least in part, the first main liner, the first auxiliary liner, the second main liner, the outsole, and in particular the junction between the second main liner and the outsole;
  the heating temperature Tc is greater than or equal to the temperature T2 in order to obtain the fusion of the thermofusible part or of the whole of the second auxiliary liner.

The second auxiliary liner further mechanically reinforces the upper, improves its abrasion resistance and its stiffness, and this in a localized way while preserving a certain flexibility since the fusible material is brought through two separate layers (the first and second auxiliary liners).

The second auxiliary liner also improves the resistance to delamination between the outsole and the first main liner.

In a variant of an embodiment, the second auxiliary liner is in a unitary textile piece, in particular knitted.

In a variant of an embodiment, the thermofusible part of the second auxiliary liner represents at least 50%, more preferably at least 80%, by mass of the total mass of the second auxiliary liner, preferentially at least 90%, in particular at least 95%, more particularly at least 99% or roughly 100% by mass of the total mass of the second auxiliary liner.

In a variant of an embodiment, the second auxiliary liner has a sole part comprising at least one area adapted to receive said projection of the outsole.

This adapted area of the second auxiliary liner is similar to said adapted area of the first auxiliary liner so that the description of the latter applies to said adapted area of the second auxiliary liner.

In a variant, the sole part of the first main liner and/or the sole part of the first auxiliary liner, and/or the sole part of the second main liner each comprise(s) a thermofusible region whose melting temperature is less than or equal to the heating temperature Tc, said thermofusible region(s) being oriented opposite the outsole.

The thermofusible region(s) facilitate(s) the adhesion of the sole part of the shoe with the outsole.

In a sub-variant, the sole part of the first main liner comprises opposite inner and outer layers, the outer layer being oriented opposite the outsole, the outer layer comprises said thermofusible region, and the inner layer, in particular oriented opposite the inner volume of the first main liner, comprises at least one non-heat-melt region, in particular said non-heat-melt region comprises one or more elastic yarns, more particularly whose melting or decomposition temperature is greater than Tc.

The outer layer promotes adhesion with the outsole while the inner layer provides flexibility and comfort as it comes into contact with the user's foot.

In a sub-variant, the sole part of the second main liner comprises opposite inner and outer layers, the inner layer facing the outsole, the inner layer comprises said thermofusible region, and the outer layer, in particular facing the outside of the shoe, in particular facing the first auxiliary liner, comprises at least one non-thermofusible region, in particular said non-thermofusible region comprises one or more elastic yarns, more particularly whose melting or decomposition temperature is greater than Tc.

In an embodiment, the thermofusible region forms at least 30%, preferably at least 40%, more preferably at least 50%, by mass of the total mass of the inner or outer layer of the sole part of the liner comprising it.

In an embodiment, the non-thermofusible region forms at least 30%, preferably at least 40%, more preferably at least 50%, by mass of the total mass of the inner or outer layer of the sole part of the liner comprising it.

In an embodiment, the thermofusible region forms the entire inner or outer layer of the sole part of the liner comprising it.

In an embodiment, the non-thermofusible region forms the entire inner or outer layer of the sole part of the liner comprising it.

In a variant of an embodiment, the areas(s) adapted to receive one or more projection(s), of the sole part of the first auxiliary liner, and/or the sole part of the second main liner, and/or of the sole part of the second auxiliary liner, intended to receive at least part of the projection(s) of the outsole is/are each, a through-opening or a pocket.

In a variant, the through-opening(s), and/or the pocket(s), are formed by at least one of the means selected from the following means: during the textile construction of the first auxiliary liner and/or the second main liner and/or the second auxiliary liner; by stamping; by fusing, in particular during step vi); and by a combination of at least two of said means.

In a variant, at least one of the liners selected from the list consisting of: the first main liner, the first auxiliary liner, the second main liner, and the second auxiliary liner, in particular the first auxiliary liner, comprises an instep region having left and right edges, and in addition a detachable temporary textile piece of unitary textile construction with said at least one selected liner, said detachable temporary textile piece comprising left and right edges connected, in particular joined, respectively to the left and right edges of said instep region, in particular through at least a plurality of breakable connecting areas.

The temporary detachable textile piece helps to position the liners in relation to each other, in particular to keep the left and right edges of the instep area close enough together during step vi). This temporary textile piece is advantageous for ensuring reproducible positioning of the liners in relation to each other when they are placed one on top of the other.

After step vi), the temporary textile piece is separated from the shoe, in particular by cutting the breakable connecting areas.

In the present text, detachable is understood to mean that the temporary textile piece can be detached from the shoe without damaging it.

The temporary detachable textile piece may comprise one or more elastic yarn(s) so as to be elastic in at least one direction, for example in the direction of the mesh columns and/or in the direction of the mesh rows.

The temporary textile piece is preferably made of one or more materials whose melting and/or decomposition temperature(s) is (are) higher than Tc, in particular so as not to be heat-melted at the end of step (vi).

The temporary textile piece may comprise non-elastic yarns.

In a variant, the first main liner and/or the second main liner comprise(s) less than 60%, preferably less than 50%, more preferably less than 30%, preferentially less than 10%, more preferentially less than 5%, and/or at least 10%, by mass of its/their total mass(es) of one or more thermofusible compound(s), in particular whose melting temperature(s) is/are less than or equal to Tc.

In an embodiment, the first main liner and/or the second main liner do/does not comprise one or more thermofusible compound(s).

In a variant, the first main liner and, the first auxiliary liner or the second main liner, are in a unitary textile piece.

In a variant of an embodiment, the first main liner is in a unitary textile piece also comprising an additional liner, and the first main liner and the additional liner are joined at their openings for inserting the foot.

In a variant of an embodiment, the additional liner is folded in the first main liner (i.e. inside the inner volume of the latter) after step (vi) in order to form a comfort sock.

In a variant of an embodiment, the additional liner is folded on the first main liner, and forms the first auxiliary liner or the second main liner or the second auxiliary liner.

In this case, the first main liner is of unitary textile construction with one of the above-mentioned liners, in particular by being in connection at their insertion openings.

In a variant of an embodiment, the outsole comprises several projections projecting from its outer face, in particular said projections are studs.

In a variant of an embodiment, the first main liner, and optionally the second main liner, and/or the additional liner, comprise(s) at least 80% (preferably substantially 100%) by mass of its/their total mass(es) of one or more material(s) whose melting or degradation temperature(s) is/are higher than Tc.

In a variant of an embodiment, the sole part of the first main liner, in particular the inner face of the sole part of the first main liner, comprises at least a first region of unitary textile construction with the first main liner, and the step of joining (iii) the outsole comprises a step of injection or extrusion (over)molding of the outsole onto the sole part of the first main liner configured so as to fill the first region and form a first fastening member and/or a cushioning element.

The first region can be placed at the heel area or forefoot area of the sole part of the first main liner.

The cushioning element can be configured to form a first fastening member as well.

The additional sock comprises a first complementary fastening member configured to cooperate, in particular removably, with the first fastening member to join them together. The first complementary first fastening member is placed on the heel area of the sole part of the additional sock.

In a variant of an embodiment, the process comprises an injection or extrusion step during which at least one reinforcement is, injected or extruded, molded, on the first main liner and/or on the second main liner.

In a variant, the assembly comprises a first region near the foot insertion opening extending to the forefoot part in which the first main liner and the second main liner are superimposed and substantially not joined.

The subject matter of the present disclosure, according to a second aspect, is a shoe in particular for the practice of sport, in particular of one of the sports selected among: soccer, hiking, athletics, rugby, and cycling, more particularly soccer or hiking, in particular obtained by the implementation of the process with reference to any one of the variants of embodiments defined above with reference to the first aspect of the disclosure, comprising:
- a first inner main liner in a textile piece having a sole part,
- an outsole joined to the sole part of the first main liner and comprising on its outer face at least one projection, in particular at least two studs, and
- a first auxiliary liner, at least partially, in particular entirely, thermofusible, in a textile piece, covering, at least partially, the first main liner, the outsole, and the junction between the first main liner and the outsole, at least part or all of the first thermofusible auxiliary liner being melted and adhered to the first main liner and the outsole.

Said thermofusible coating covers at least partially, the first main liner, the outsole, and the junction between the latter, in particular at least in part the outer face of the outsole.

In a variant, the outsole comprises one or more projections, in particular studs projecting from its outer face, and the sole part of the first auxiliary liner comprises one or more areas adapted to receive each, at least in part, a projection.

In a variant, said shoe comprises a rear reinforcement element of unitary textile construction with the first main liner or the first auxiliary liner, or the second main or auxiliary liner, said rear reinforcement element comprising fused thermofusible yarns, in particular is made entirely of fused thermofusible yarns.

Preferably, the rear reinforcement element opens into the inner volume receiving the foot of the first main liner.

The rear reinforcement element extends at least partially in the rear, lateral and medial parts of the first main liner.

The main reinforcement element has an open C-shape on the front part of the first main liner.

The main reinforcement element is preferably a textile housing, in particular a textile pocket, in particular projecting from the foot insertion area of the first main liner.

Preferably, the shoe comprises an elastically deformable element, in particular a foam, arranged in the textile housing of the main reinforcement element.

The elastically deformable element is reversibly deformable, i.e. it can be deformed and/or compressed and return to its original shape substantially without residual deformation, or with a residual deformation of less than 5% in relation to its original dimensions.

Preferably, the elastically deformable element comprises rear, side and medial portions.

Preferably, the thickness of the rear portion (for example of the order of 1 cm) of the elastically deformable element is decreasing towards the medial and lateral parts.

Thus, the rear part, and in particular the lateral and medial parts, of the first main liner is/are arranged, at least partially, between the rear reinforcement element, and the rear part, and in particular the lateral and medial parts, of the first auxiliary liner.

Advantageously, the rear reinforcement element is made during the knitting or weaving of the first main liner.

Before step vi), the rear reinforcement element comprises at least one opening, in particular at least two openings, allowing access to its inner volume to place the elastically deformable element therein.

Preferably, the elastically deformable element has a melting or decomposition temperature higher than Tc.

In a variant, the rear reinforcement element opens into the inner volume receiving the foot of the shoe, and the rear reinforcement element forms a housing delimiting an inner volume receiving an elastically deformable element.

In a variant of an embodiment, the outsole has studs projecting from its outer face, and the sole part of the first auxiliary liner has holes through which the studs project.

In a variant, the shoe comprises a second main liner arranged, at least in part, on the first main liner, the first auxiliary liner and the outsole, the first main liner is in a textile piece and comprises in its forefoot part, in particular the instep area, at least one lacing loop of unitary textile construction with the textile piece of the first main liner. The second main liner comprises in its forefoot part at least one lacing opening configured to permit the passage of the lacing loop through the lacing opening so as to project out of the lacing opening.

In a variant, the shoe comprises a second main liner in a textile piece arranged, at least in part, over the first main liner, the first auxiliary liner and the outsole, and the second main liner comprises in its forefoot region at least one lacing loop of unitary textile construction with the textile piece forming the second main liner.

The embodiments described below with reference to the lacing loops apply to the two preceding variants of embodiments.

In an embodiment, the lacing loop is delimited by two openings, in particular of unitary textile construction, in particular knitted, arranged in the forefoot part of the first and/or second main liner(s).

The lacing loop is in particular equivalent to the knitted bridge described below with reference to the example embodiments.

In particular, the instep area of the first and/or second main liner(s) comprises first and second sets of lacing through-openings. Each first and second set of lacing through-openings comprises several, for example between three and six, sets of two openings, the two openings in each set being separated by a knitted portion forming first and second bridges. The first and second bridges are substantially aligned by sets of openings in a transverse direction T substantially perpendicular to the longitudinal axis L of the first/second main liner(s).

In an embodiment, the lacing loop is formed by a woven weft knitted yarn, said loop projecting from the outer face of the forefoot part of the first main liner.

The variants, embodiments and definitions of the disclosure with reference to a first aspect may be combined independently of each other with the variants, embodiments and definitions of the disclosure with reference to a second aspect.

BRIEF DESCRIPTION OF THE DRAWINGS

The disclosure and its advantages will be better understood by reading the detailed description of the particular embodiments, taken by way of non-limiting examples and illustrated by the appended drawings wherein.

DETAILED DESCRIPTION

Figure 1:
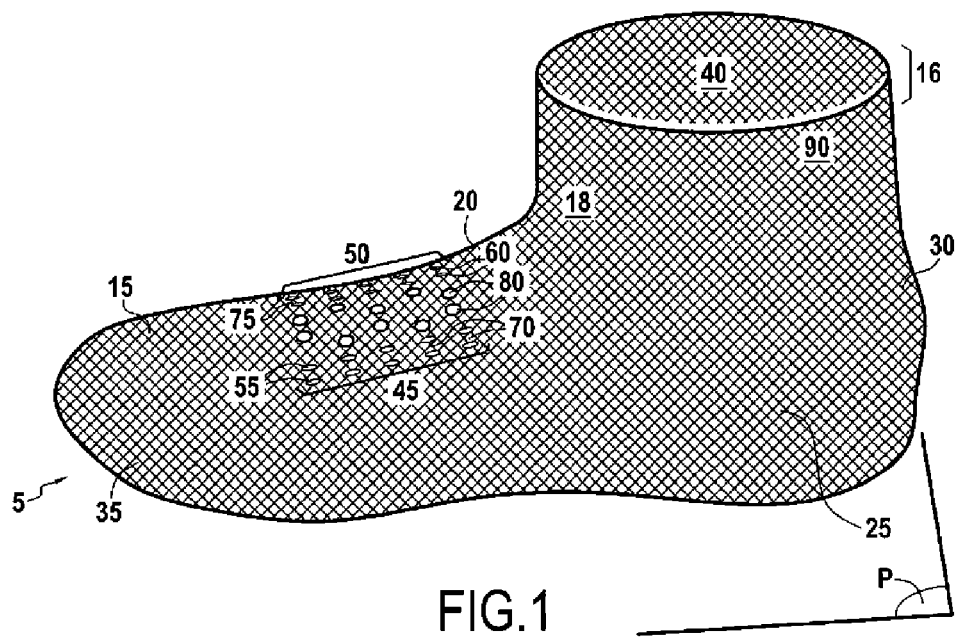
FIG. 1 is a schematic side-view representation of the first main liner of a first example shoe according to the disclosure.
Figure 2:
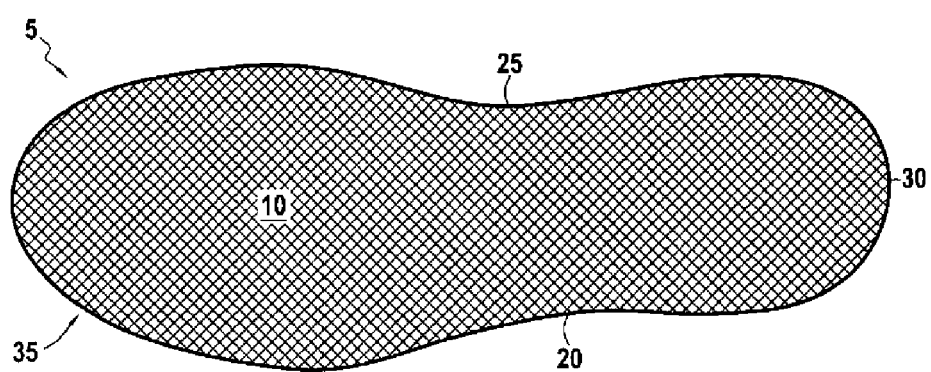
FIG. 2 is a schematic bottom-view representation of the first main liner shown in FIG. 1.

The first main liner 5 shown in FIGS. 1 and 2 comprises a sole part 10, a forefoot part 15, a lateral part 20, a medial part 25 and a rear part 30. The first main liner 5 is in particular in a unitary knitted textile shell 35, in particular with picked stitches, having an inner volume 40 configured to receive the user's foot. The rear 30, lateral 20, medial 25 and forefoot 15 parts project vertically from the plane P comprising the sole part 10. The lateral 20 and medial 25 parts are arranged between and in connection with the rear part 30 and forefoot part 15.

The forefoot part 15 comprises in the instep area 18 first and second sets of lacing through-openings 45, 50. Each first and second set of lacing through-openings 45, 50 comprises five sets of two openings 55, 60, the two openings 57, 58; 67, 68 of each set 55, 60 being separated by a knitted portion forming first and second bridges 70, 75. The first bridges 70 and the second bridges 75 are substantially aligned by sets of openings 55, 60 in a transverse direction T substantially perpendicular to the longitudinal axis L of the first main liner 15.

The forefoot part 15 also comprises in the instep area 18, a set of ventilation through-openings 80, in particular arranged between the two sets of lacing through-openings 45,50. The set of ventilation openings 80 is placed in an area of the first main liner 15 substantially centered between the medial 25 and lateral 20 parts. The set of ventilation openings 80 comprises for example ten through-openings.

The first main liner 5 shown in FIG. 1 comprises at the foot insertion region 16, a area in the form of a closed collar 90, in a mesh pattern of the type rib n×p, where n and p are integers different from 0 and less than or equal to 5, for example ribs 1×1, or 1×2. This area 90 thus forms a soft and elastic border facilitating the insertion of the foot.

The first main liner 5 is joined to an outsole 100 comprising a set of studs 105, particularly arranged for playing soccer, projecting from its outer face 101.

Figure 3:
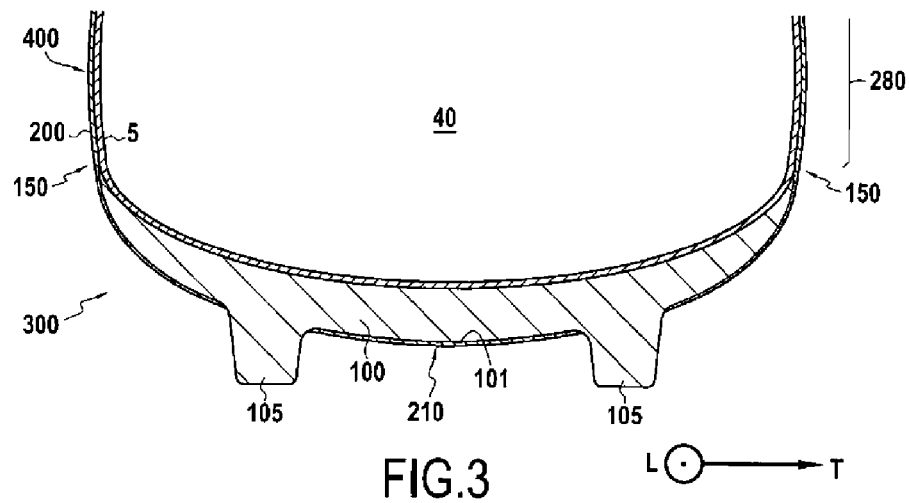
FIG. 3 is a schematic cross-sectional representation of the first example shoe according to the disclosure comprising the first main liner shown in FIGS. 1 and 2.
Figure 4:
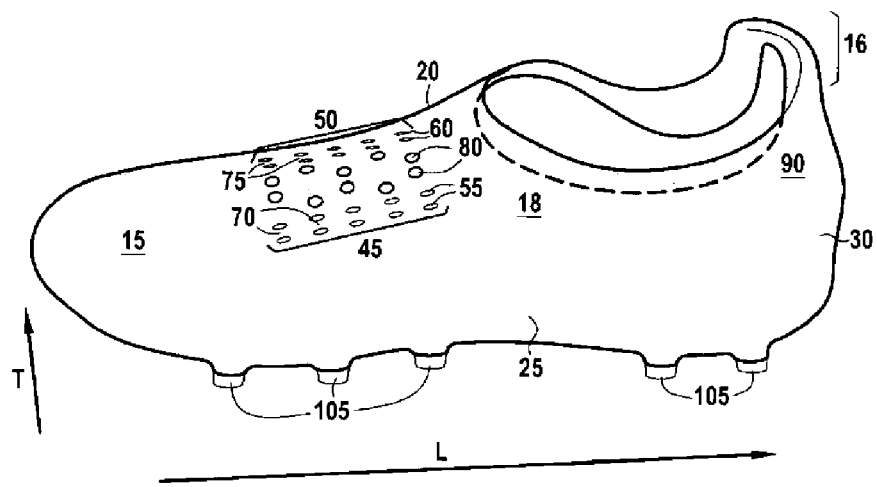
FIG. 4 is a side-view representation of a part of the first example shoe according to the disclosure.
Figure 7:
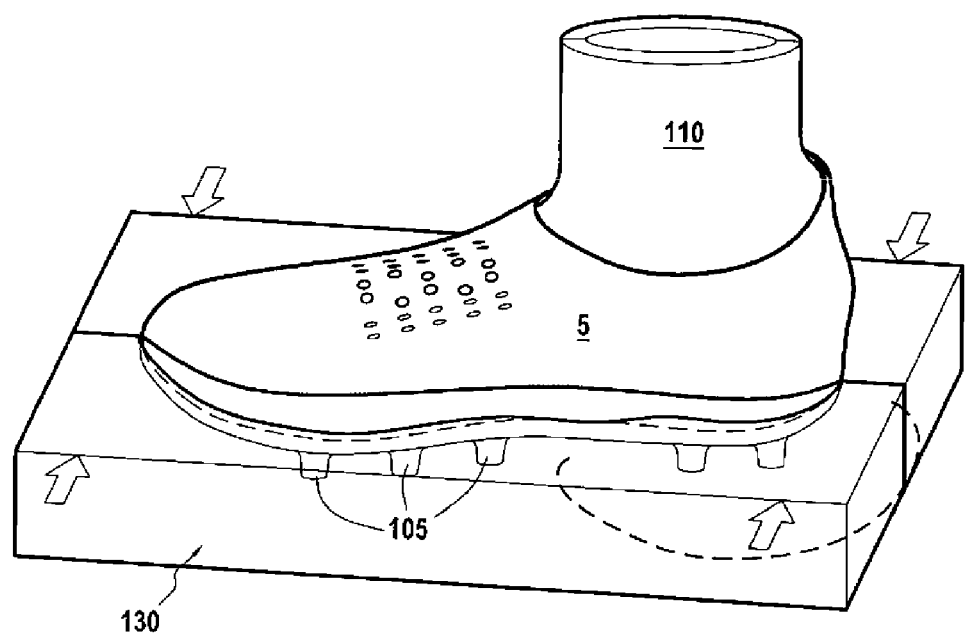
FIGS. 7 and 8 schematically represent steps (ii), (iii) and step (v) of the process according to the disclosure for the manufacture of the first example shoe shown in FIG. 3.
Figure 8:
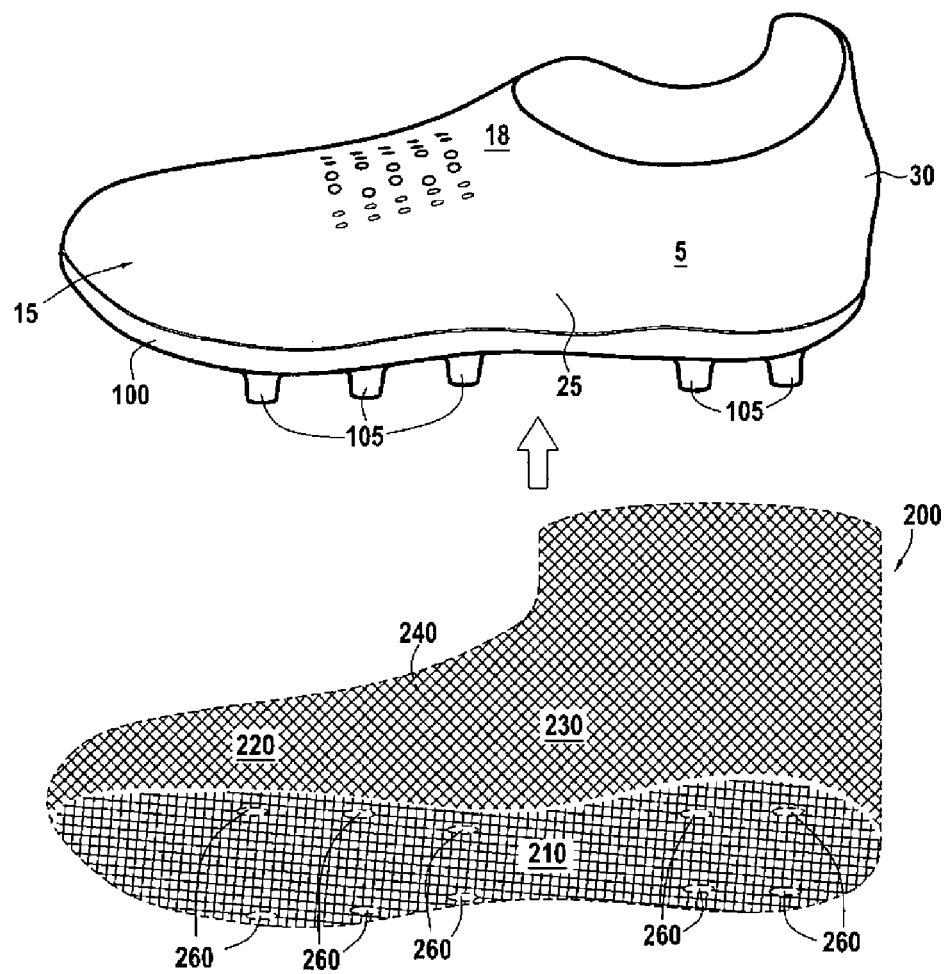

As shown in FIGS. 7 and 8, the first main liner 5 is placed on a rigid preform 110 in the shape of a foot. It is possible to place a lace in the first and second set of lacing through-openings 45, 50 to facilitate the positioning and plating of the first main liner 5 on the preform 110. Then, the sole part 10 of the first main liner 5 is placed in a counter-mold 130 (in one or two parts) so that the outer face of the sole part 10 projects into the inner volume of the counter-mold into which a polymer composition is injected to make the outsole 100. The preform 110 is removed from the mold, the main liner 5 and the outsole 100 comprising studs 105 are thus joined together (see FIG. 4). Then, a first auxiliary liner 200 in a textile piece at least part or all of which is thermofusible and has a melting temperature T1 (° C.) is placed on the first main liner 5 and the outsole 100 so as to cover, at least in part, the first main liner 5, the outsole 100, and the junction 150 between the first main liner 5 and the outsole 100. The first auxiliary liner 200 comprises sole 210, forefoot 220, medial 230, lateral 240 and rear 250 parts, of which the forefoot 220, medial 230, lateral 240 and rear 250 parts are in whole or in part respectively against the forefoot, medial, lateral and rear parts of the first main liner 5. The sole part 210 of the first auxiliary liner 200 comprises a set of areas 260 adapted to receive the studs 105, said areas 260 are in particular through-openings from which the studs 105 project. In this specific example, the first auxiliary liner 200 is in a fully fusible textile piece with a melting temperature T1. Then, the assembly forming the upper 280 comprising the first main liner 5 and the first auxiliary liner 200, is subjected to a heating temperature Tc greater than or equal to the temperature T1 in order to obtain the complete fusion of the first auxiliary liner 200. Preferably, a heating system is placed inside the preform 110. The shoe 300 obtained, shown in part in cross-section in FIG. 3, has an improved resistance to delamination between the outsole 100 and the first main liner 5 since the junction 150 is covered with a polymer film 400 showing in relief the textile aspect of the first main liner 5. It is also possible, complementarily, to place the upper assembly 280 in a mold whose inner face is engraved so as to impart one or more specific pattern(s) to the polymer film 400 according to the regions of the upper assembly 280 of the shoe 300.

The first main liner 5 is in a textile shell knitted with stitches picked up in three dimensions at the exit of a circular or rectilinear knitting machine, in particular rectilinear. In this specific example, the first main liner 5 is knitted with 500 dtex polyethylene terephthalate multifilament yarns for about 204 filaments. The mass of the first main liner 5 is comprised between 100 g/m$^2$ and 250 g/m$^2$, in particular of the order of 170 g/m$^2$.

The first auxiliary liner 200 is in a textile piece knitted with picked stitches (in three dimensions) on a circular knitting machine from monofilament single-component yarns, in particular polyurethane, the diameter of which is comprised between 0.10 mm and 2 mm, in particular of the order of 1 mm. The first auxiliary liner 200 can comprise areas with varying yarn densities in order to create areas with a greater thickness than other areas and thus ultimately a film 400 having areas of greater thickness.

The mass of the first auxiliary liner 200 is comprised between 30 g/m$^2$ and 200 g/m$^2$, in particular of the order of 50 g/m$^2$.

The outsole 100, including the studs 105, has a mass comprised between 100 g/m$^2$ and 400 g/m$^2$. The final mass of the shoe 300 depends finally on the size of the shoe, it is in particular comprised between 200 and 250 g/m$^2$ (including the laces), in particular for a European size 43.

The outsole 100 is in this example made of elastomer material, in particular TPU.

Figure 5:
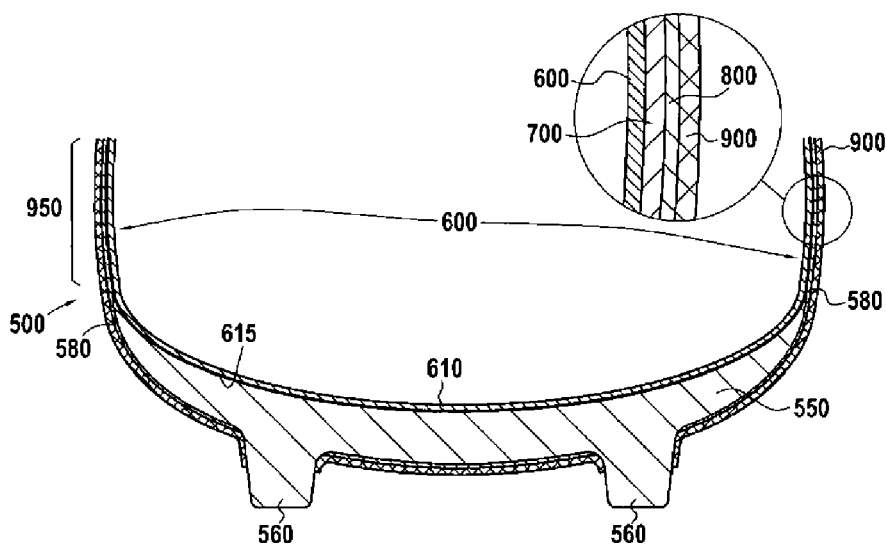
FIG. 5 is a schematic cross-sectional representation of a second example shoe according to the disclosure.

FIG. 5 shows a sectional view of another example shoe 500 according to the disclosure. The shoe 500 comprises a first main liner 600 preferably with a melting or decomposition temperature greater than the temperature Tc, a first auxiliary liner 700 preferably fully thermofusible (T1 less than Tc), a second main liner 800 preferably with a melting or decomposition temperature greater than the temperature Tc, a second auxiliary liner 900 preferably fully thermofusible (T2 less than Tc) and an outsole 550 with studs 560. The first and second main liners 600, 800 and the first and second auxiliary liners 700, 900 each comprise rear, sole, forefoot, medial and lateral parts.

The outsole 550 is preferably over-molded, in particular by injection as described in reference to FIGS. 7 and 8, on the outer face 615 of the sole part 610 of the first main liner 600.

The first main liner 600 joined to the outsole 550 and placed on a rigid preform (as described above in reference to the shoe 300), and optionally heated, is covered with a first auxiliary liner 700, a second main liner 800 and then a second auxiliary liner 900 determining an upper assembly 950. The sole parts of the first and second auxiliary liners 700, 900 and of the second main liner each comprise a set of areas adapted to receive the studs 560, in particular through-openings through which the studs project. The junction 580 between the outsole 550 and the first main liner 600 is thus completely covered by two layers of polymer films from the first and second auxiliary liners 700, 900 and the textile shell of the second main liner 800, thus further improving the resistance to delamination.

The first main liner 600 comprises in this specific example first and second sets of through-openings to form lacing loops similar to those 45,50 supported by the first main liner 5 (by their structures and their placements) but does not comprise ventilation openings 80. The second main liner 800 comprises ventilation openings similar to those 80 of the first main liner 5 (by their structures and their placements).

It is also possible (not shown) that the second main liner 800 also comprises said first and second sets of through-openings to form lacing loops, which first and second sets are then not present on the first main liner 600.

Figure 6:
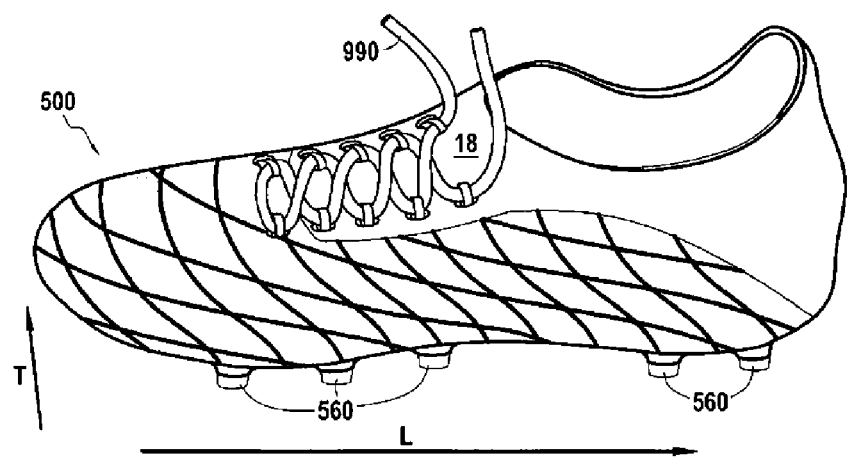
FIG. 6 is a schematic side-view representation of the second example shoe shown in FIG. 5.

Furthermore, in this embodiment, the second main liner 800, the second auxiliary liner 900, and the first auxiliary liner each comprise in their forefoot region at least one lacing opening, in particular two sets of lacing openings placed on either side of the instep area and arranged so as to cooperate with the lacing loops of the first main liner so as to project through the lacing openings. A lace 990 is passed through the lacing openings, as shown in FIG. 6. The junction 580 between the outsole 550 and the first main liner 600 is invisible. Preferably, with the exception of the studs 560, the outsole 550 is not visible.

The first and second main liners 600, 800 can be identical or different.

The first and second auxiliary liners 700, 900 can be identical or different, in particular similar to the first auxiliary liner 200.

Figure 9:
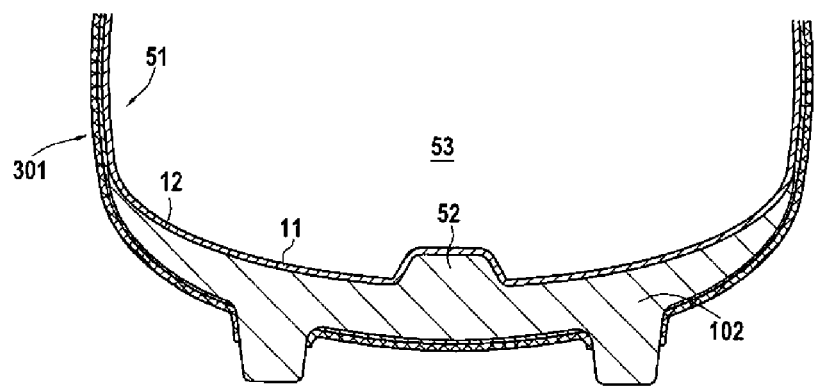
FIG. 9 is a schematic cross-sectional representation of a third example shoe according to the disclosure.

FIG. 9 shows a shoe 301, which is a variant of the shoe 300, in which the first main liner 51 comprises a first region 52, in particular forming a housing, integrally knitted with the latter 51 and projecting from the inner face 12 of the sole part 11 into the inner volume 53 of the first main liner 51. During the manufacture of the outsole 102 by injection molding for example, the injected polymer composition intended to form the outsole 102 flows into the knitted housing 52 and fills said housing 52 thus forming a cushioning element and/or a fastening member.

The first main liner 51 may comprise a first knitted region 52 disposed in the heel region of sole part 11 and/or a first knitted region 52 disposed in the forefoot region of the sole part 11. Said fastening member may cooperate with a complementary fastening member supported by an sole for example for their removable attachment.

Figure 10:
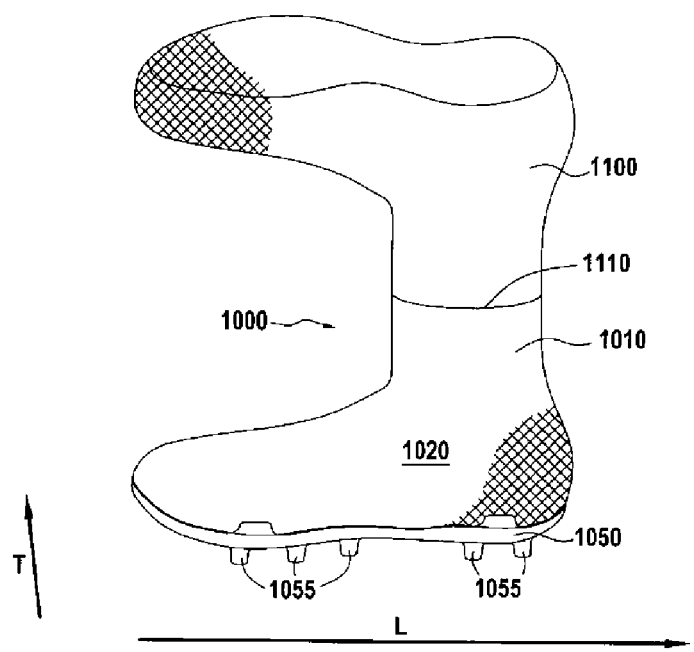
FIG. 10 is a schematic side-view representation of a variant of the first main liner joined to the outsole shown in FIG. 4.

FIG. 10 shows a first main liner 1000 in conjunction with an additional liner 1100 at their respective insertion openings 1010, 1110 of the respective foot.

The first main liner 1000 is shown joined to the outsole 1050 provided with studs 1055. The additional liner 1100 can thus be folded into the inner volume 1020 of the first main liner 1000 and thus forms a receiving liner. The additional liner 1100 can also be used as a first or second auxiliary liner or as a second main liner within the meaning of the present disclosure. In the latter case, it is necessary to arrange a first auxiliary liner between the first main liner 1000 and the second main liner formed by the additional liner 1100.

Figure 11:
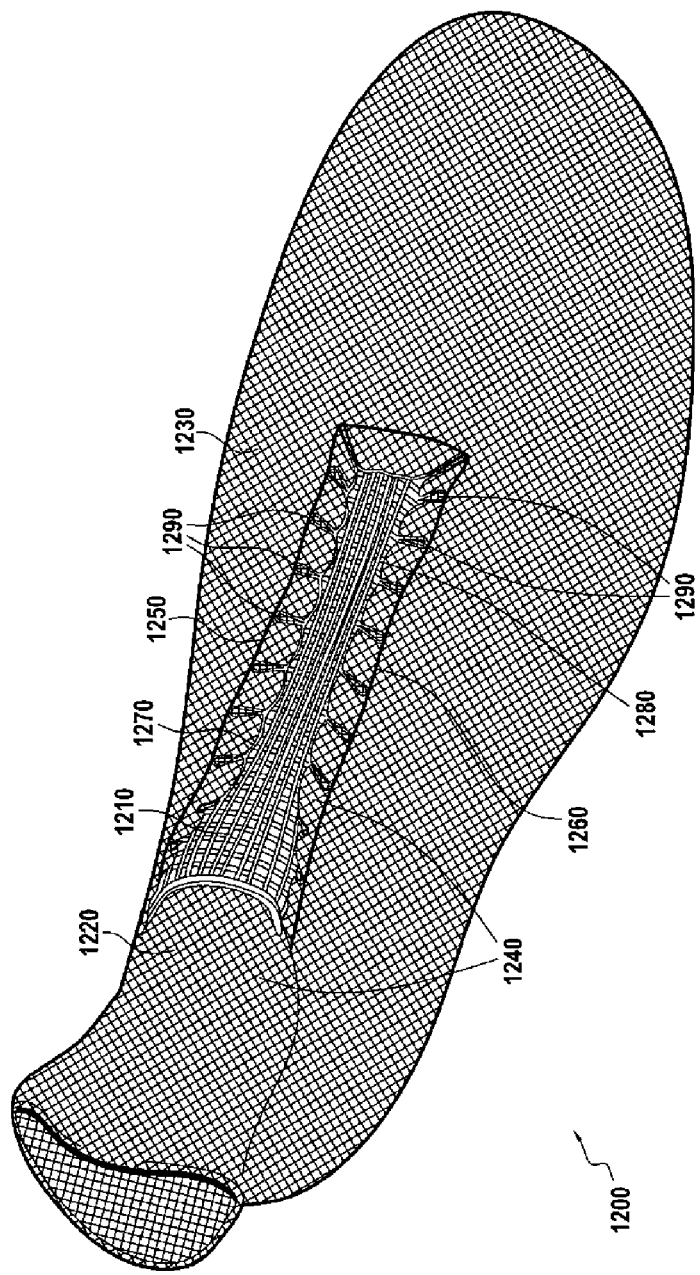
FIG. 11 is a schematic top-view representation of a fourth example shoe according to the disclosure comprising a temporary detachable textile piece.

The shoe 1200 shown in FIG. 11 comprises a temporary detachable textile piece 1210 of unitary textile construction with the first auxiliary liner 1230, which is completely melted and thus forms a heat-melted outer coating at least partially covering a second main liner 1220. The temporary piece 1210 is not thermofusible, and therefore as shown in FIG. 11 after step vi). The second main liner 1220 comprises an instep region 1240 having left 1250 and right 1260 edges. The temporary detachable textile piece 1210, in particular knitted, comprises left 1270 and right 1280 edges connected, in particular joined, respectively with left 1250 and right 1260 edges of said instep region 1240, in particular through at least a plurality of breakable connecting areas 1290, in particular textile connecting loops, in particular knitted.

The temporary detachable textile piece 1210, which is in particular breakable, helps to position the liners in relation to each other, in particular to keep the left and right edges of the instep region 1240 sufficiently close together in step vi). After step vi), the temporary textile piece 1210 is separated from the shoe 1200, in particular by cutting the breakable connecting areas 1290.

Figure 12:
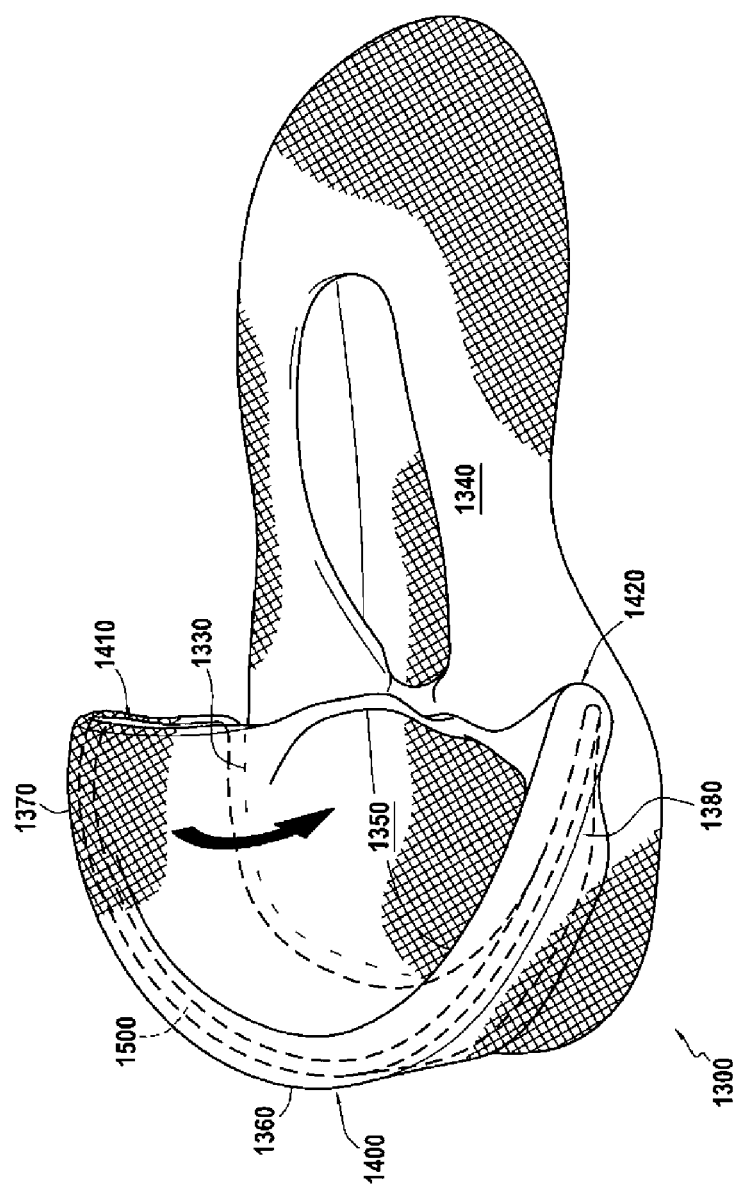
FIG. 12 is a schematic top-view representation of an example of the first main liner according to the disclosure.

FIG. 12 represents a variant of the first main liner according to the disclosure allowing a rear reinforcement element to be formed. The first main liner 1300, shown alone in FIG. 12 and before its assembly with other liners, thus comprises a rear reinforcement element 1400 of unitary textile construction with the first main liner 1300, and consisting partly or entirely, preferably entirely, of thermofusible yarns whose melting temperature(s) is/are lower than Tc. Thus, after step vi), the rear textile reinforcement element 1400 is totally or partially melted.

The rear reinforcement element 1400 is shown in FIG. 12 before folding it into the inner volume 1350 for receiving the foot of the first main liner 1300. During superimposition of the first main liner 1300 with one or more other liners according to the disclosure to form an assembly undergoing a step of thermocompression in step vi), the rear reinforcement element 1400 is folded in the direction of the arrow shown in FIG. 12 so as to be found on the finished shoe as opening directly into the inner volume for receiving the foot of the shoe. Advantageously, the rear reinforcement element 1400 is made during the knitting or weaving of the first main liner 1300.

The rear reinforcement element 1400 extends at least partially into the rear 1360, lateral 1370 and medial 1380 parts of the first main liner 1300.

In this specific example, the main reinforcement element 1300 has an open C-shape on the front part 1340 of the first main liner 1300.

The main reinforcement element 1400 is preferably a textile housing, in particular a textile pocket, in particular projecting from the area for inserting the foot 1330 of the first main liner 1300.

Preferably, the shoe comprises an elastically deformable element 1500, in particular a foam, disposed in the inner volume of the textile housing of the rear reinforcement element 1400.

The elastically deformable element can be deformed and/or compressed and recover its initial shape substantially without residual deformation, or with a residual deformation of less than 5% in relation to its original dimensions.

Preferably, the elastically deformable element comprises rear, side and medial portions.

Before step vi), the rear reinforcement element 1400 preferably comprises at least one opening 1410, in particular at least two openings 1410,1420, allowing access to its inner volume to place the elastically deformable element 1500 therein.

The rear reinforcement element 1400 undergoes step vi) in a folded state against, at least partially, the rear, lateral and medial parts of the first main liner 1300, so that it is joined to these parts of the first main liner 1300. The openings 1410 and 1420 are then closed by the melted thermofusible yarns. The elastically deformable element is thus perfectly maintained in the housing of the rear reinforcement element 1400.

The invention claimed is:

1. A process for manufacturing a shoe comprising the following steps:
 (i) providing at least one main liner in a textile piece, having a sole part;
 (ii) placing at least the first main liner on a preform;
 (iii) joining an outsole to the sole part of the first main liner;
 (iv) providing at least one first auxiliary liner in a textile piece, at least part or all of which is thermofusible and has a melting temperature T1 (° C.);
 (v) arranging the first auxiliary liner on the first main liner and the outsole so as to cover, at least partially, the first main liner, the outsole, and the junction between the first main liner and the outsole;
 (vi) subjecting the assembly comprising the first auxiliary liner, the first main liner, and the outsole, placed on the preform, to a heating temperature Tc greater than or equal to the temperature T1 so as to achieve melting of the thermofusible part or the entire first auxiliary liner;

(vii) removing the assembly from the preform and recovering the shoe.

2. The process for manufacturing a shoe as claimed in claim 1, wherein the first auxiliary liner is in a unitary textile piece.

3. The process for manufacturing a shoe as claimed in claim 1, wherein the thermofusible part of the first auxiliary liner represents at least 50% by mass of the total mass of said first auxiliary liner.

4. The process for manufacturing a shoe as claimed in claim 1, wherein the outsole comprises on its outer face at least one projection projecting from the outer face, and wherein the sole part of the first auxiliary liner comprises at least one area adapted to receive, at least in part, said at least one projection projecting from the outer face of the outsole.

5. The process for manufacturing a shoe as claimed in claim 4, wherein the at least one projection comprises a lower face configured to come into contact with the ground.

6. The process for manufacturing a shoe as claimed in claim 4, wherein the process comprises a step of providing a second main liner having a sole part comprising at least one area adapted to receive, at least in part, said projection, the second main liner being arranged:

on the first auxiliary liner in step (v) such that the first auxiliary liner is disposed, at least in part, between the second main liner and the first main liner; or on the first main liner in step (v) such that the second main liner is disposed, at least in part, between the first main liner and the first auxiliary liner.

7. The process for manufacturing a shoe as claimed in claim 6, wherein it comprises:

providing a second auxiliary liner in a textile piece, at least part or all of which is thermofusible and has a melting temperature T2 (° C.); and arranging in step (v) the second auxiliary liner on the second main liner and the outsole so as to cover, at least partially, the first main liner, the first auxiliary liner, the second main liner, the outsole, and the junction between the first main liner and the outsole;

the heating temperature Tc is greater than or equal to the temperature T2 in order to obtain the fusion of the thermofusible part or of the whole of the second auxiliary liner.

8. The process for manufacturing a shoe as claimed in claim 1, wherein at least one of the sole part of the first main liner and the sole part of the first auxiliary liner comprises a thermofusible region whose melting temperature is less than or equal to the heating temperature Tc, said thermofusible region(s) being oriented opposite the outsole.

9. The process for manufacturing a shoe as claimed in claim 8, wherein the sole part of the first main liner comprises opposite inner and outer layers, the outer layer being oriented opposite the outsole, in that the outer layer comprises said thermofusible region, and the inner layer comprises at least one non-thermofusible region.

10. The process for manufacturing a shoe as claimed in claim 4, wherein the area(s) of the sole part of the first auxiliary liner that is/are adapted to receive at least in part one or more projection(s) of the outsole is/are a through-opening or a pocket.

11. The process for manufacturing a shoe as claimed in claim 10, wherein at least one of the through-opening(s) and pocket(s) is formed by at least one of: during the textile construction of at least one of the first auxiliary liner, by stamping, and by fusion.

12. The process for manufacturing a shoe as claimed in claim 1, wherein at least one of the liners selected from a list comprising: the first main liner and the first auxiliary liner comprises an instep region having left and right edges, and further comprises a temporary detachable textile piece of unitary textile construction with said at least one selected liner, said removable temporary textile piece comprising left and right edges in connection with the left and right edges of said instep region, respectively.

13. The process for manufacturing a shoe as claimed in claim 1, wherein the first main liner and the first auxiliary liner are in a unitary textile piece.

14. The process for manufacturing a shoe as claimed in claim 1, wherein the first main liner is in a unitary textile piece, the unitary textile piece also comprises an additional liner, and the first main liner and the additional liner are joined at foot insertion openings.

15. The process for manufacturing a shoe as claimed in claim 14, wherein the additional liner is folded into the first main liner after step (vi) so as to form a comfort sock.

16. The process for manufacturing a shoe as claimed in claim 14, wherein the additional liner is folded over the first main liner and forms the first auxiliary liner.

17. The process for manufacturing a shoe as claimed in claim 1, wherein the outsole comprises a plurality of projections projecting from its outer face.

18. The process for manufacturing a shoe as claimed in claim 1, wherein the first main liner comprises at least 80% by mass of its total mass one or more materials whose melting or degradation temperature(s) are higher than Tc.

19. The process for manufacturing a shoe as claimed in claim 1, wherein the assembly comprises a first region in the vicinity of a foot insertion opening extending towards a forefoot area in which the first main liner and the second main liner are superimposed and substantially not joined.

20. A shoe for the practice of sport, obtainable by the implementation of the process as claimed in claim 1, comprising a first main liner in a textile piece having a sole part, an outsole joined to the sole part of the first main liner and comprising on its outer face at least one projection, and a first auxiliary liner, at least partially thermofusible, in a textile piece, at least partially covering the first main liner, the outsole, and the junction between the first main liner and the outsole, at least part or all of the first thermofusible auxiliary liner being melted and adhering to the first main liner and to the outsole.

21. The shoe as claimed in claim 20, wherein the outsole comprises one or more projections projecting from its outer face, and wherein the sole part of the first auxiliary liner comprises one or more areas adapted to each receive, at least in part, a projection.

22. The shoe as claimed in claim 20, comprising a rear reinforcement element of unitary textile construction with the first main liner or the first auxiliary liner, said rear reinforcement element comprising melted thermofusible yarns.

23. The shoe as claimed in claim 22, wherein the rear reinforcement element opens into an inner volume for receiving a foot of a wearer, and the rear reinforcement element forms a housing delimiting an inner volume receiving an elastically deformable element.

24. The shoe as claimed in claim 20, wherein the projections are at least two studs.

25. The process for manufacturing a shoe as claimed in claim 1, wherein at least one liner chosen among the first main liner and the first auxiliary liner is a shell comprising a sole part, a lateral part, a medial part, a front part as an extension of the medial, lateral and sole parts, and a rear part as an extension of the medial, lateral, and sole parts, the shell delimits an inner volume configured to receive a foot of a wearer, and said shell is a unitary textile piece.

26. The process for manufacturing a shoe as claimed in claim 1, wherein said process comprises providing a rear reinforcement element that is of unitary textile construction with the first main liner or the first auxiliary liner, said rear reinforcement element comprising melted thermofusible yarns.

27. The process for manufacturing a shoe as claimed in claim 26, wherein said rear reinforcement element opens into an inner volume configured to receive a foot of a wearer, and the rear reinforcement element forms a housing delimiting an inner volume receiving an elastically deformable element.

\* \* \* \* \*